Patented July 4, 1950

2,514,328

UNITED STATES PATENT OFFICE 2,514,328

POLYVINYLISOCYANATE AND DERIVATIVES THEREOF

Giffin D. Jones, Easton, Pa., assignor to General Aniline & Film Corporation, New York, N. Y., a corporation of Delaware No Drawing. Application October 23, 1945, Serial No. 624,093

3 Claims. (Cl. 260—8)

The present invention relates to new polymeric materials and more particularly to polyvinylisocyanate and new polymeric derivatives obtainable from polyvinylisocyanate by reacting polyvinylisocyanate with compounds having an —OH group.

The invention has as an object the preparation of polyvinylisocyanate.

A further object of the invention is the preparation of new compounds from polyvinlyisocyanate which are compatible with gelatin and may be utilized as substitutes therefor and in combination therewith to provide new compositions useful in the photographic arts.

According to one aspect of my invention, polyvinylisocyanate is prepared by introducing acrylyl chloride into a suspension of sodium azide in an organic solvent, distilling the reaction mixture to dryness and extracting polyvinylisocyanate from the dry residue. A feature of this procedure for producing the polymer is that it lends itself to the production of monomeric vinylisocyanate. By fractionally distilling the distillate, a fraction was obtained which on redistillation contained monomeric vinylisocyanate. This fraction boiled at 48–50° C.

In a more desirable modification, polyvinylisocyanate is prepared by introducing acrylyl chloride in a suspension of sodium azide with a solvent for the monomer and the polymer and recovering the polymer by mixing with a liquid in which the polymer is insoluble and precipitates.

In the first modification, the ethers have been found to be suitable solvents in which to carry out the reaction. As an example, butyl ether has been found to be especially satisfactory as the solvent. In the more desirable modification, dimethylformamide has been found to be highly effective as a solvent in which to carry out the reaction, and ethyl ether as the precipitating liquid for the polymer. When following the procedure of this modification, a more complete reaction is obtained. In each of the above procedures, monomeric vinylisocyanate forms and polymerizes during the reaction.

According to another aspect of my invention, polymeric derivatives of polyvinylisocyanate are obtained by reacting the latter with compounds containing an —OH group, and which may be represented by the following general formula:

R O H, wherein R is hydrogen or an alkyl radical, such as methyl, ethyl, propyl, etc. As such compounds, there may be mentioned water and the aliphatic alcohols, such as for example, ethyl alcohol. To facilitate this reaction, it is preferred to have present a catalyst, such as hydrochloric acid or hydrogen chloride which have been found to be highly effective for this purpose.

As an example of this reaction where water is the —OH containing compound, polyvinylisocyanate is heated with concentrated hydrochloric acid to form a water-soluble, solid, hygroscopic hydrochloride of hydrolized polyvinylisocyanate.

As an example of the reaction where an alcohol is the —OH containing compound, polyvinylisocyanate is refluxed with an alcoholic solution of hydrogen chloride to form a water-soluble product which is an alcoholized polyvinylisocyanate and possesses the nitrogen content of ethyl N-polyvinylcarbamate. The alcoholysis may be carried out in the absence of hydrogen halide in which case a polymer free from chlorine is obtained.

The reaction of the polyvinylisocyanate with the —OH containing compounds results in derivatives of polyvinylisocyanate which, when mixed with gelatin, are compatible therewith and form clear viscous solutions which, on casting, yield clear films. The following examples will serve to illustrate my invention. The parts are by weight.

Example 1

To 300 parts of sodium azide activated with hydrazine according to the process described by Nelles, Ber., 65,1345 (1932), suspended in 1600 parts of butyl ether were added 317 parts of acrylyl chloride. The acrylyl chloride was added over a period of 1 hour while the mixture was stirred at a bath temperature of 90° C. and the reaction maintained for 12 hours. The reaction mixture was then distilled to dryness at 22 mm. pressure, and the combined distilled products were then fractionally distilled. There was obtained a fraction which on redistillation boiled at 48–60° C., $n_D^{25}$ 1.3735. The fraction contains monomeric vinylisocyanate. A white solid which precipitated from the 48–50° C. fraction on standing for about an hour at room temperature was a copolymer of vinylisocyanate and acrylyl chloride.

The fraction boiling at 48–50° C. contained monomeric vinylisocyanate as indicated by the fact that when a portion of the fraction in ether was treated with ammonia gas and steam distilled from an acidified solution into alcohol the 2,4-dinitrophenylhydrazone of acetaldehyde was obtained, which is a test for monomeric vinylisocyanate.

From the dry residue remaining after distilling the reaction mixture to dryness, there was obtained on repeated extraction with dimethylformamide, clarification by centrifuging, and precipitation by spraying into absolute ether a tan colored powder which was identified as polyvinylisocyanate.

Analysis.—Calculated for $(C_3H_3NO)_n$: N,20.37. Found: N,18.90, $\eta$ rel 1.060 (1% in dimethylformamide.)

Example 2

The procedure was repeated as described in the first two sentences of Example 1, except that 1,000 parts of dimethylformamide were employed as the solvent instead of butyl ether. By utilizing the dimethylformamide instead of butyl ether, the reaction was more complete and there was obtained polyvinylisocyanate in the form of a suspension in dimethylformamide. The polymer was recovered by precipitation with ether. After precipitation in ether, the polymer could be only partially redissolved in dimethylformamide.

Analysis.—Calculated for $(C_3H_3NO)_n$: N,20.37. Found: (for soluble fractional) N,16.17; (for insoluble fraction), N,20.01.

When external heating was applied more of the insoluble polyvinylisocyanate was obtained.

The following are illustrative of the preparation of the hydrolysis products of polyvinylisocyanate:

Example 3

100 parts of polyvinylisocyanate prepared according to Example 2 were dissolved by stirring for 12 hours at 100° C. with a 38% hydrochloric acid solution. The dark solution which formed was made alkaline below 50° C. and dialysed. Upon evaporation there was obtained 7 parts of a hygroscopic black powder which was insoluble in absolute alcohol but soluble in water. It had a softening point of 240° C. (Dennis). $\eta$ rel 1.022 (1% in water).

The following are illustrative of the preparation of the alcoholysis products of polyvinylisocyanate:

Example 4

Polyvinylisocyanate prepared according to Example 1 was reacted with ethyl alcohol by refluxing with 400 parts of the latter for 13 days. The resulting solution was poured into ether whereby there was obtained an alcoholysis product in the form of a tan powder which was soluble in water. The polymer thus obtained had $\eta$ rel 1.062 (1% in dimethylformamide); softening point 90° (Dennis); $\eta$ rel 1.040 (1% in water).

Analysis.—Calculated for $(C_5H_9NO_2)_n$: N,12.17. Found: N, 13.34.

Example 5

61 parts of polyvinylisocyanate were subjected to long refluxing with alcoholic hydrogen chloride. The alcoholic hydrogen chloride was prepared by saturating alcohol with hydrogen chloride at room temperature. There was obtained a first soluble product similar to that in Example 4 and a second product that was insoluble in alcohol but soluble in water.

Analysis.—Calculated for $(C_2H_6ClN)$: Cl,44.58. Found: Cl, 53.10.

Example 6

10 parts of polyvinylisocyanate prepared as in Example 2 were partially dissolved in a solution made up of 8 parts of absolute alcohol and 100 parts of dimethylformamide, and the mixture was refluxed for 3 days in an oil bath. Precipitation of the filtrate in absolute ether yielded a brown, water-soluble polymer. $\eta$ rel 1.151 (1% in water).

Analysis.—Calculated for $(C_5H_9NO_2)_n$: N,12.17. Found: N,18.71.

Example 7

10 parts of polyvinylisocyanate prepared as in Example 2 were refluxed in 250 parts of dry pyridine and 16 parts of ethyl alcohol 4 days in an oil bath. A powdery, water-soluble, neutral precipitate of an alcoholized polymer was obtained.

The concentration of hydrochloric acid utilized for hydrolizing the polyvinylisocyanate may be varied, but it has been found most effective to use a concentrated hydrochloric acid solution and preferable an acid solution of 18% or higher.

In connection with the alcoholysis of polyvinylisocyanate with alcoholic hydrogen chloride, a solution is utilized which is prepared by saturating ethanol at room temperature with hydrogen chloride. The hydrolysis and alcoholysis reactions are facilitated by heating. In the case of hydrolysis, temperatures of 90–100° C. are satisfactory although lower or higher temperatures may be employed. In the case of alcoholysis, refluxing temperatures were desirably used for carrying out this reaction.

The reaction temperature in forming the polyvinylisocyanate may be varied. Where it is formed in butyl ether, a preferred temperature range is from about 60–90° C.; while about 90° C. is preferable where it is formed in dimethylformamide. The order of adding the reagents is significant in the smoothness of the reaction, and in order to obtain most effective results, the acryl chloride should be added to the sodium azide suspension.

The product obtained by the alcoholysis of polyvinylisocyanate has the nitrogen content of ethyl-N-polyvinylcarbamate. The product because of its water-solubility, compatibility with gelatin and resistance to saponification, forms a highly valuable feature of my invention.

The following are illustrative of the compatibility of my new polyvinylisocyanate derivatives with gelatin.

Example 8

One part each of the alcoholized polyvinylisocyanates as obtained in Examples 4, 5 (the first product), 6 and 7 and 1 part of gelatin were mixed with 18 parts of water. A solution was obtained which when cast formed clear films.

Example 9

One part of the hydrolyzed polyvinylisocyanate product obtained in Example 3 and 1 part of gelatin were mixed with 18 parts of water. The resulting solution when cast formed a clear film.

The polyvinylisocyanate may be utilized in solutions for coating or as a solid to make shaped articles.

I claim:

1. A composition of matter comprising gelatin and a water-soluble reaction product of polyvinylisocyanate and a compound having the following formula: ROH, where R stands for a member selected from the group consisting of hydrogen and alkyl radicals.

2. A composition of matter comprising gelatin and the water-soluble reaction product of polyvinylisocyanate, and alcoholic hydrogen chloride.

3. A composition of matter comprising gelatin and the water-soluble reaction product of polyvinylisocyanate, and water acidified with hydrochloric acid.

GIFFIN D. JONES.

REFERENCES CITED

The following references are of record in the file of this patent:

UNITED STATES PATENTS

| Number | Name | Date |
|---|---|---|
| 2,188,167 | Whitehead | Jan. 23, 1940 |
| 2,280,986 | Toland et al. | Apr. 28, 1942 |
| 2,326,287 | Coffman | Aug. 10, 1943 |
| 2,334,476 | Coffman | Nov. 16, 1943 |
| 2,346,866 | Dangelmajer | Feb. 8, 1944 |

OTHER REFERENCES

Jones et al., "J. Org. Chem.," Nov. 1944, pages 500–2.